Patented Sept. 14, 1937

2,092,970

UNITED STATES PATENT OFFICE 2,092,970

PROCESS FOR THE MANUFACTURE OF TERTIARY-BUTYL DERIVATIVES OF ANILINE

Bernard Herstein, Brooklyn, N. Y., assignor to U. S. Industrial Alcohol Co., New York, N. Y., a corporation of West Virginia No Drawing. Application October 22, 1935, Serial No. 46,123. Renewed May 17, 1937

7 Claims. (Cl. 260—124)

This invention is directed to the production of certain useful derivatives of aniline which have been known as chemical compounds but which have not been, as far as I am aware, commercially available to the chemical industry, if indeed their potential value has been realized.

The process herein described provides a simple and economical way of manufacturing, with excellent yields, the following products: (I) para-tertiary-butyl-acetanilide, (II) para-tertiary-butyl-aniline, (III) ortho-nitro-para-tertiary-butyl-acetanilide, and (IV) ortho-nitro-para-tertiary-butyl-aniline. These terms refer respectively to the following compounds:

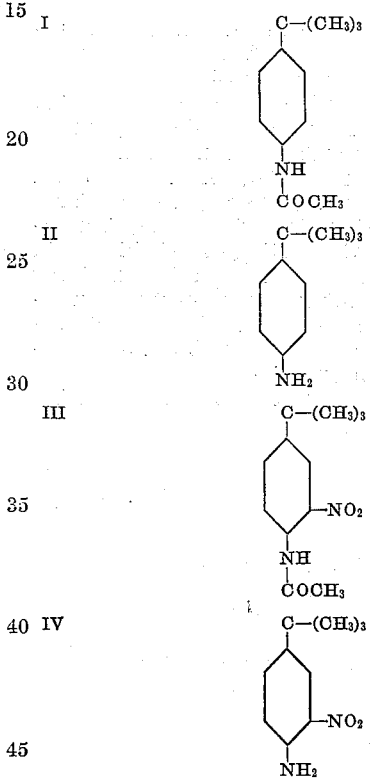

The ortho-nitro-para-tertiary-butyl-aniline product may be used to advantage in the manufacture of yellow azo-dyestuffs, while para-tertiary-butyl-aniline is suitable for purposes similar to those for which para-toluidine is used, for the production of compounds of the same general character but with some specific properties of their own.

Alkyl derivatives of aniline such as the toluidines or xylidines are much used intermediates in the chemical industry. They are ordinarily prepared by nitration of the corresponding hydrocarbons followed by reduction of the nitro compounds. Economically, this process has the important disadvantage that in making the nitro compound a number of isomers are produced simultaneously, the separation of which is cumbersome and costly.

Thus, to give but one instance: in preparing para-toluidine, toluol is nitrated, but the resulting product, as a rule, contains only about one-third of the desired para-nitro-toluol, the balance being principally the ortho-nitro-derivative with a small percentage of the meta compound. Only by elaborate chemical operations can the three isomers be separated from one another and it facilitates matters little whether the separation is attempted on the original nitro-compounds or the mixture of the corresponding amines, which is obtained on reduction.

By the process of this invention such difficulties are avoided.

The process consists, in the first place, in subjecting acetanilide to the well-known Friedel-Crafts reaction in presence of tertiary-butyl chloride and anhydrous aluminum chloride or its equivalent.

Aniline itself does not lend itself to this reaction, one of the reasons being its strongly basic character and the general rule that in the Friedel-Crafts reaction hydrochloric acid is liberated.

I have found that the acetylated aniline lends itself remarkably to the Friedel-Crafts reaction, with tertiary-butyl chloride, the product thus obtained being para-tertiary-butyl-acetanilide of high purity and good yield.

The following example illustrates the preferred mode of operation. The parts of ingredients will be understood to be parts by weight.

34 parts acetanilide are suspended in 85 parts ethylene dichloride and 40 parts aluminum chloride are added. The temperature tends to rise but by cooling is not permitted to go above 50° C. When all but a very small amount of aluminum chloride is in solution the reaction mixture is cooled to —10° C. and 25.2 parts tertiary-butyl chloride added. The temperature is maintained at about —5° C. for 30 minutes. At this temperature, the evolution of hydrochloric acid gas is not vigorous and the reaction may be maintained at that temperature at which the evolution of HCl is just visible from the surface of the reaction mixture.

This is then poured cautiously into 250 parts of cracked ice by which the intermediate complex of aluminum chloride and the organic compound is decomposed by the water and the aluminum chloride goes into solution while the p-tertiary-butyl-acetanilide and ethylene dichloride form a doughy mass or solution which is removed and washed two or three times with fresh water to leach out as much inorganic material as possible. The solvent ethylene dichloride is then removed either by steam distillation or other convenient method. This leaves the product, para-tertiary-butyl-acetanilide, behind in the form of a crystalline mass which may be filtered and washed and subsequently dried. The average weight of the material thus obtained is 45–46 parts. The material may be further purified if desired, though a higher degree of purity is not required for most purposes.

From the para-tertiary-butyl-acetanilide thus produced the para-tertiary-butyl-aniline product is obtained by subjecting the former product to a simple hydrolysis or deacetylation step of known character, using either alkalis or acids for the purpose as is well known in the art.

Or else, the para-tertiary-butyl-acetanilide is nitrated in the manner familiar in the nitration of acetyl-para-toluidine for example, to form ortho-nitro-para-tertiary-butyl-acetanilide, by deacetylation of which ortho-nitro-para-tertiary-butyl-aniline is obtained as an end product of an economic process.

In the example which has been given of the step of making the para-tertiary-butyl-acetanilide intermediate, the reaction is carried out in a medium of ethylene dichloride, which acts as an inert diluent and prevents the reaction from proceeding at too rapid a rate, which would adversely affect both yield and quality of the product. Other inert media, however, may be used, preferably only such as will give a homogeneous reaction mixture, for instance nitro-benzene, methylene dichloride, trichlorethylene or chloroform. For the same reason, i. e. to keep the reaction from being too rapid, it is advisable to keep the temperature low, approximately between plus and minus 10° C.

Latitude is permissible in respect to proportions, temperature, and in the order of mixing ingredients, provided, however, that the tertiary butyl chloride is not brought in direct and sole contact with the aluminum chloride, in which event a vigorous reaction decomposing the butyl chloride into butylene and hydrochloric acid would occur.

I claim:

1. A process for the preparation of tertiary-butyl derivatives of aniline, which comprises the step of reacting acetanilide with tertiary-butyl chloride in the presence of aluminum chloride.

2. A process for the preparation of tertiary-butyl derivatives of aniline, which comprises the step of reacting acetanilide with tertiary-butyl chloride in the presence of aluminum chloride in an inert medium which gives a homogeneous reaction phase.

3. A process for the preparation of tertiary-butyl derivatives of aniline, which comprises the step of reacting acetanilide with tertiary-butyl chloride in the presence of aluminum chloride in ethylene dichloride as a reaction medium.

4. A process for the preparation of tertiary-butyl derivatives of aniline, which comprises reacting acetanilide with tertiary-butyl chloride in the presence of aluminum chloride in an inert medium, and decomposing the resulting aluminum-organic complex with resulting production of para-tertiary-butyl-acetanilide.

5. A process for the preparation of tertiary-butyl derivatives of aniline, which comprises reacting acetanilide with tertiary-butyl chloride in the presence of aluminum chloride, decomposing the resulting aluminum-organic complex with water to liberate the para-tertiary-butyl-acetanilide, washing the same, and separating same from the reacted mass by crystallization and washing.

6. A process for the preparation of tertiary-butyl derivatives of aniline, which comprises reacting acetanilide with tertiary-butyl chloride in the presence of aluminum chloride, obtaining from the reacted mixture para-tertiary-butyl-acetanilide, and nitrating this material to obtain ortho-nitro-para-tertiary-butyl-acetanilide.

7. A process for the preparation of tertiary-butyl derivatives of aniline, which comprises reacting acetanilide with tertiary-butyl chloride in the presence of aluminum chloride, obtaining from the reacted mixture para-tertiary-butyl-acetanilide, nitrating this material, and deacetylating the nitro compound to obtain ortho-nitro-para-tertiary-butyl-aniline.

BERNARD HERSTEIN.